United States Patent
Matuska et al.

[11] Patent Number: 5,642,982
[45] Date of Patent: Jul. 1, 1997

[54] RETRACTION/EXTENSION MECHANISM FOR VARIABLE DIAMETER ROTORS

[75] Inventors: David G. Matuska, Huntington; Edward W. Gronenthal, Shelton, both of Conn.

[73] Assignee: Sikorsky Aircraft Corporation, Stratford, Conn.

[21] Appl. No.: 570,579

[22] Filed: Dec. 11, 1995

[51] Int. Cl.[6] .................................................. F04D 29/18
[52] U.S. Cl. .................................................. 416/87; 416/88
[58] Field of Search .................................. 416/87, 88

[56] References Cited

U.S. PATENT DOCUMENTS

| | | | |
|---|---|---|---|
| 2,108,245 | 2/1938 | Ash | 416/88 |
| 2,510,216 | 6/1950 | Figley | 416/88 |
| 2,637,406 | 5/1953 | Isacco | 416/88 |
| 2,996,121 | 8/1961 | Stub | 416/88 |
| 3,768,923 | 10/1973 | Fradenburgh | 416/89 |
| 3,814,351 | 6/1974 | Bielawa | 416/87 |
| 3,884,594 | 5/1975 | Fradenburgh | 416/87 |
| 4,007,997 | 2/1977 | Yarm | 416/61 |
| 4,074,952 | 2/1978 | Fradenburgh et al. | 416/87 |
| 5,253,979 | 10/1993 | Fradenburgh et al. | 416/223 |
| 5,299,912 | 4/1994 | Fradenburgh et al. | 416/87 |

OTHER PUBLICATIONS

Copy of an article from Space/Aeronautics dated Nov. 1969.

*Primary Examiner*—John T. Kwon
*Attorney, Agent, or Firm*—Brian A. Collins

[57] ABSTRACT

A retraction/extension mechanism (70) for a Variable Diameter Rotor system (10), the Variable Diameter Rotor system (10) having a plurality of rotor blade assemblies (16) mounted to and rotating with a rotor hub assembly (18) about an axis of rotation (20), each rotor blade assembly (16) having inboard and outboard blade sections (24, 22) wherein the outboard blade section (22) telescopically mounts to the inboard blade section (24). The retraction/extension mechanism (70) includes a reeling assembly (80) disposed in combination with the outboard blade section (22) of each rotor blade assembly (16) and an epicyclic gear train (100) disposed in combination 7ith the rotor hub assembly (18) and the reeling assembly (80). The epicylic gea2 train is, furthermore, operative for driving the reeling assembly (80) so as to effect telescopic transition of the outboard blade sections (22) with respect to the inboard blade sections (24).

22 Claims, 5 Drawing Sheets

RETRACTION/EXTENSION MECHANISM FOR VARIABLE DIAMETER ROTORS

TECHNICAL FIELD

This invention relates to Variable Diameter Rotor (VDR) systems for tilt-rotor or tilt-wing aircraft, and more particularly, to a retraction/extension mechanism for varying the spanwise length of the rotor blade assemblies of such rotor systems.

BACKGROUND OF THE INVENTION

A tilt-rotor or tilt-wing aircraft typically employs a pair of rotor systems which are supported at the outermost end of a wing structure and are pivotable such that the rotors thereof may assume a vertical or horizontal orientation. In a horizontal orientation, the aircraft is capable of hovering flight, while in a vertical orientation, the aircraft is propelled in the same manner as conventional propeller-driven fixed-wing aircraft.

Currently, tilt-rotor/tilt-wing aircraft employ conventional fixed-diameter rotor systems which, in the aerodynamic and aeroelastic design thereof, attempt to blend the competing requirements of hovering and forward flight modes of operation. For example, with regard to hovering flight, it is generally advantageous to employ a large diameter rotor to improve hovering performance by lowering disk loading, reducing noise levels, and reducing downwash velocities. Conversely, a relatively small diameter rotor is desirable in forward flight to improve propulsive efficiency by minimizing blade aeroelastic properties, minimizing blade area, and reducing tip speed (Mach number).

Variable Diameter Rotor (VDR) systems are known to provide distinct advantages over conventional fixed-diameter rotors insofar as such systems are capable of adaptation to both modes of operation. That is, when the plane of the rotor is oriented horizontally, the rotor diameter is enlarged for improved hovering efficiency and, when oriented vertically, the rotor diameter is reduced for improved propulsive efficiency.

An example of a VDR system and VDR blade assembly therefor is shown in Fradenburgh 3,768,923 wherein each blade assembly includes an outer blade section which telescopes over an inner blade section, i.e., a torque tube member, so as increase or decrease the rotor diameter. The outer blade section includes a structural spar, i.e., the foremost structural element which carries the primary loads of the outer blade section, a leading edge sheath assembly and trailing edge pocket assembly, which sheath and pocket assemblies envelop the spar section to define the requisite aerodynamic blade contour. The torque tube member mounts to a rotor hub assembly and receives the spar member of the outer blade section. The torque tube member, furthermore, functions to transfer flapwise and edgewise bending loads to and from the rotor hub assembly while furthermore imparting pitch motion to the outer blade section.

The resultant torque tube/spar assembly forms an internal chamber for accepting a retraction/extension mechanism. The retraction/extension mechanism includes a threaded jackscrew which is disposed internally of the torque tube member and is supported at its inboard and outboard ends by means of journal bearing supports. Furthermore, the jackscrew may be driven in either direction by a bevel gear arrangement disposed internally of the rotor hub assembly. The jackscrew engages a plurality of stacked nuts which are rotationally fixed by the internal geometry of the torque tube member yet are permitted to translate axially along the jackscrew upon rotation thereof. Furthermore, centrifugal straps extend from each nut and are affixed, via a retention block, to the tip end of the spar member. As the jackscrew turns, the stacked nuts are caused to translate inwardly or outwardly, thereby effecting axial translation of the outer blade section. Systems relating to and/or further describing VDR systems/blade assemblies are discussed in U.S. Pat. Nos. 3,884,594, 4,074,952, 4,007,997, 5,253,979, and 5,299,912.

As with all rotor blade assemblies, the VDR blade assembly is exposed to various aerodynamic loads which result in multidirectional displacement of the blade assembly, e.g., flapwise and edgewise bending motions. Consequently, the torque tube and spar members, are appropriately designed and constructed of materials, e.g., advanced composites, which permit a degree a compliance to accommodate such motions. While the torque tube and spar members are readily fabricated from such materials, the complex geometry and loading conditions imposed on the jackscrew assembly require the use of high strength metallic materials which are less compliant and more susceptible to fatigue damage. Areas which are particularly prone to fatigue damage are those nearest the journal bearing supports. As a result, the service life of the jackscrew may be substantially lower than other components of the s blade assembly, e.g., the enveloping torque tube.

In addition to the structural requirements for accommodating blade excursions, other requirements associated with ballistic survivability must be satisfied to meet certain military requirements. For example, ballistic survivability requires that redundant load paths be established to maintain the structural integrity of the blade assembly in the event of a ballistic impact. Generally, multi-fiber materials such as fiber-reinforced composites offer superior ballistic properties due to the inherent redundancy provided by the fiber matrix and resistance to crack propagation. Metallic materials are characterized by high crack propagation rates and, consequently, are less desirable from a survivability standpoint. Insofar as the jackscrew is necessarily constructed of such metallic materials, it represents a point of vulnerability for the VDR blade assembly. This vulnerability is particularly evident when considering that the jackscrew assembly is the sole structural element which retains the outboard blade section.

Other retraction/extension mechanisms for VDR systems employ reeling assemblies wherein a spool member winds or unwinds a compliant cable which is affixed to the outboard blade section. More specifically, a main rotor shaft drives the spool member which, in turn, drives the rotor system about the rotor shaft axis. That is, the geometry of the shaft-driven spool member is such that the centrifugal force of the outboard blade section acting on the spool member creates a torque that balances the rotor shaft torque, thereby driving the rotor system. Such retraction/extension mechanisms are known in the art and are described in a November 1969 article published in Space/Aeronautics Magazine.

While retraction/extension mechanisms which employ reeling assemblies obviate the issues associated with fatigue, i.e., the cable is sufficiently compliant to accommodate blade motions, such reeling assemblies are not directly controlled by the pilot, but are indirectly controlled by the torque being applied to the rotor system. That is, the rotor blades are retracted and/or extended as a function of the collective pitch input being made to the rotor system. More specifically, as collective pitch is increased for cruise flight, the torque of the rotor shaft is increased to maintain constant rotor speed. At the same time, the increased collective pitch causes the rotor system, which is rotationally decoupled from the drive shaft, to decelerate with respect thereto. Consequently, the cables are caused to be wound about the spools, thereby retracting the rotor blade assemblies. As the rotor blades retract, the torque required to drive the rotor system decreases until such time that the rotor shaft torque matches that generated by the spool/cable arrangement. For rotor blade extension, the sequence is reversed. That is, as collective pitch is decreased, the torque required to drive the rotor system decreases and, consequently, the rotor system accelerates with respect to the rotor shaft. The cables, in turn, unwind from the spool thereby extending the rotor blade assemblies. As such, this system lacks the capability for positive control of rotor blade position, which control is particularly important in the event of a engine failure while the rotor blades are partially or fully-retracted. That is, a sudden decrease in rotor shaft torque results in rapid and uncontrolled blade extension. Should this event occur when the rotor system is in cruise flight, i.e., when the rotor systems are oriented vertically, such blade extension could result in catastrophic contact with the passenger cabin. Furthermore, the radial acceleration of the outboard blade sections would likely result in cable failure.

In addition to the undesirable features discussed above, the reeling assembly of the prior art imposes large torsional loads on the input drive shaft which drives the spool member. This will be appreciated by recognizing that the centrifugal loads acting on the outboard blade section (on the order of 40,000 lbs (178,000N)) must be reacted in torsion by the input drive shaft. Consequently, the diameter and/or the thickness of the input drive shaft must be appropriately configured to react the imposed loads. Such requirements adversely impact the design envelop and/or the weight of the VDR system.

A need therefore exists to provide a retraction/extension mechanism for a VDR system which is controlled by pilot input, provides improved fatigue life, and is ballistically survivable, without adversely impacting the design envelop and/or the weight thereof.

SUMMARY OF THE INVENTION

It is an object of the present invention to provide a retraction/extension mechanism for varying the length of the rotor blade assemblies of a Variable Diameter Rotor (VDR) system which retraction/extension mechanism is directly controlled by pilot input.

It is another object of the present invention to provide such a retraction/extension mechanism which employs an epicylic gear train for driving a reeling assembly, which epicylic gear train reduces torsional loads, and consequently, the torque required for driving the reeling assembly.

It is another object of the invention to provide such a retraction/extension mechanism which unloads the epicyclic gear train when the rotor blade assemblies are fully-extended and fully-retracted.

It is yet another object of the invention to provide such a retraction/extension mechanism wherein the reeling assembly employs a compliant strap means for providing improved fatigue life.

It is yet further object of the invention to provide such a retraction/extension mechanism wherein the compliant strap means is composed of multiple fibers or cables for improved ballistic survivability.

These and other objects are achieved by a retraction/extension mechanism for a VDR system, the VDR system having a plurality of rotor blade assemblies mounted to and rotating with a rotor hub assembly about an axis of rotation, each rotor blade assembly having inboard and outboard blade sections wherein the outboard blade section telescopically mounts to the inboard blade section. The retraction/extension mechanism includes a reeling assembly disposed in combination with the outboard blade section of each rotor blade assembly and an epicyclic gear train disposed in combination with the rotor hub assembly and the reeling assembly. The epicylic gear train is, furthermore, operative for driving the reeling assembly so as to effect telescopic transition of the outboard blade sections with respect to the inboard blade sections.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 2b is a cross-sectional view taken substantially along line 2b—2b of FIG. 2a;

FIG. 2c is a cross-sectional view taken substantially along line 2c—2c of FIG. 2a;

FIG. 3b is a cross-sectional view taken substantially along lines 3b—3b of FIG. 3a;

BEST MODE FOR CARRYING OUT THE INVENTION

Figure 1A:
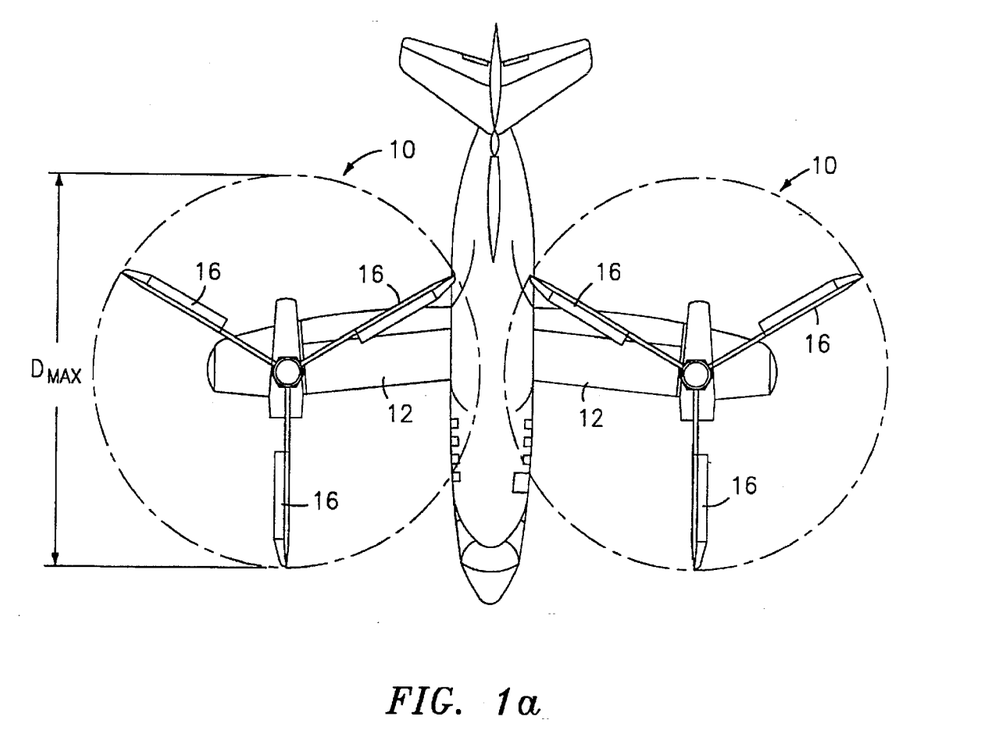
FIGS. 1a and 1b depict a tilt rotor aircraft in hovering and forward flight modes of operation, respectively, which tilt rotor aircraft employs a pair of Variable Diameter Rotor (VDR) systems.
Figure 1B:
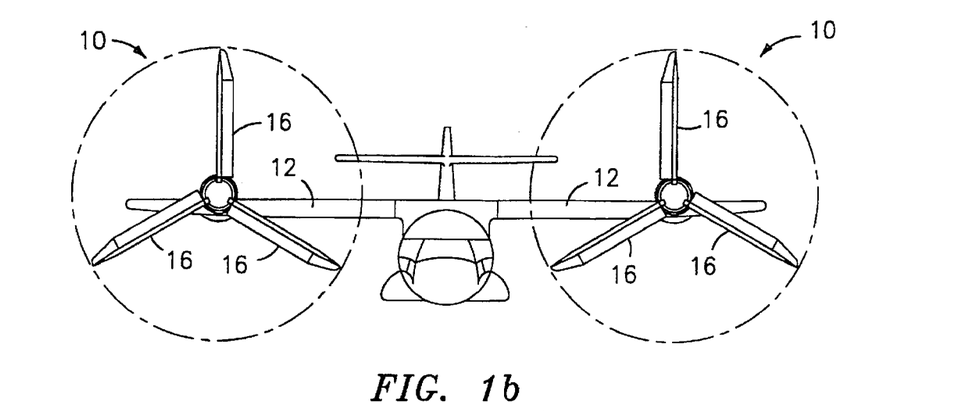

Referring now to the drawings wherein like reference characters identify corresponding or similar elements throughout the several views, FIGS. 1a and 1b show a tilt rotor aircraft having a pair of Variable Diameter Rotor (VDR) systems 10 mounted to laterally extending wing sections 12. The VDR systems 10 are pivotable so as to assume a horizontal or vertical orientation. Each VDR system 10 includes a plurality of Variable Diameter Rotor (VDR) blade assemblies 16 which are capable of extending or retracting, i.e., varying spanwise length, thereby increasing or decreasing the rotor diameter. In FIG. 1a, the VDR blade assemblies 16 are in a fully-extended position for hovering flight, i.e., in a horizontal orientation relative to a ground plane, and, in FIG. 1b, the blade assemblies 16 are fully-retracted for operating in forward flight i.e., in a vertical orientation.

Figure 2A:
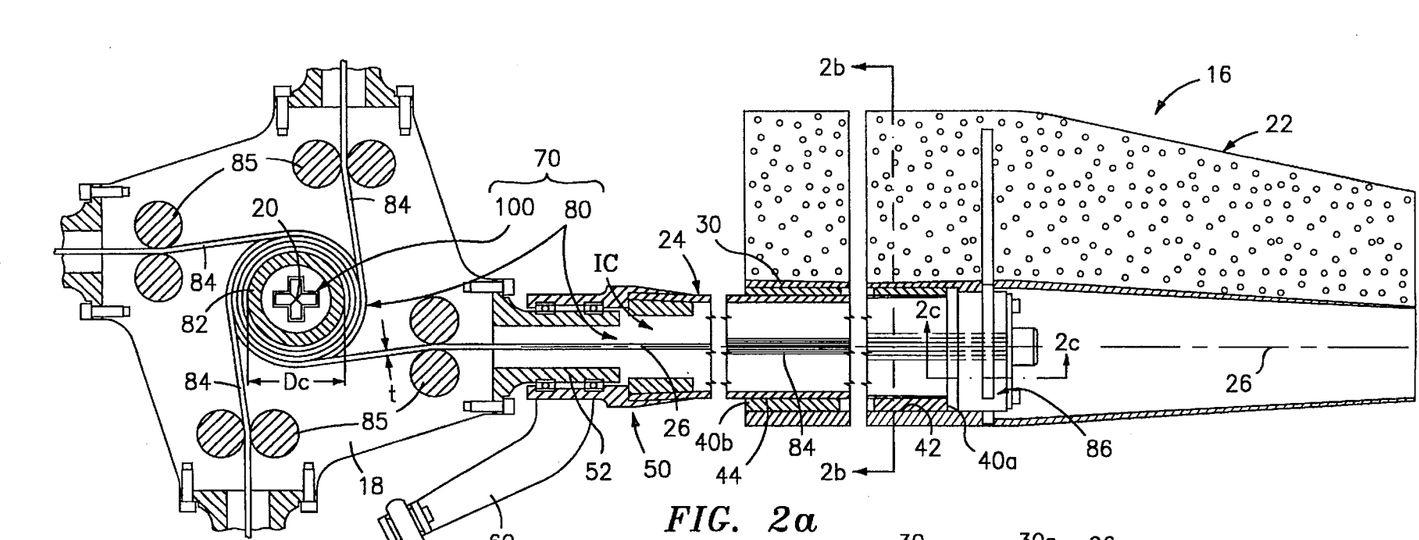
FIG. 2a depicts a broken-away top view of a VDR rotor system/blade assembly in combination with the relevant portions of the retraction/extension mechanism which cooperate with the VDR blade assembly.
Figure 2B:
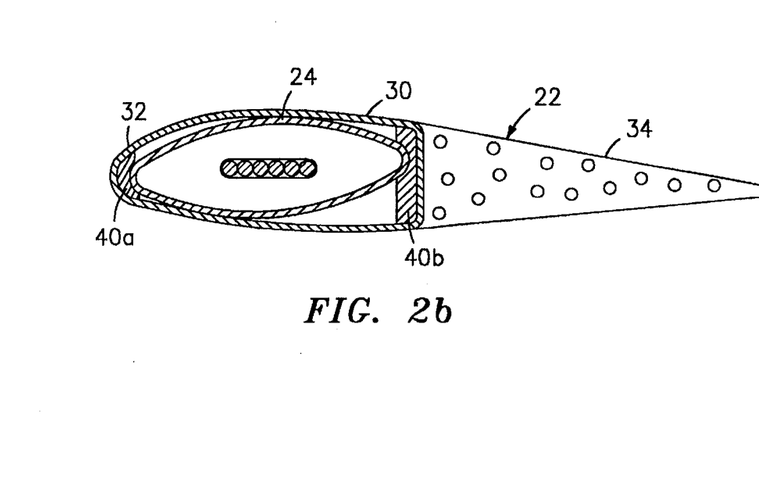
Figure 2C:
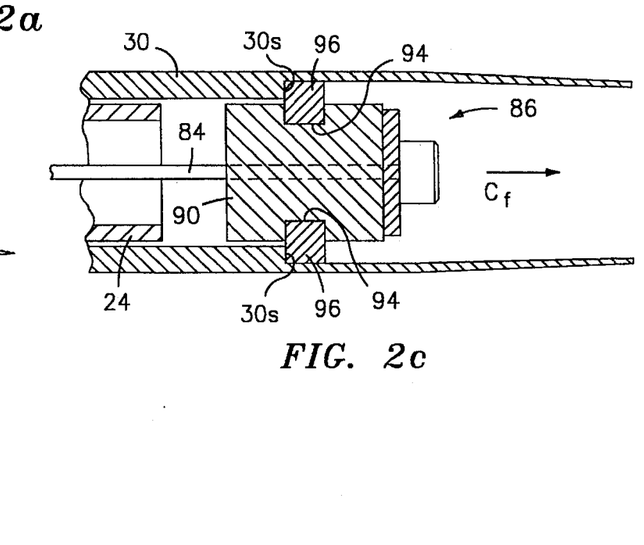

In FIGS. 2a–2c, an exemplary VDR blade assembly 16 is broken-away and sectioned for revealing the relevant portions of the retraction/extension mechanism 70 which cooperate with the blade assembly 16 for varying spanwise length. Insofar as the VDR blade assemblies 16 are essentially identical, it should be understood that the following description of the exemplary VDR blade assembly 16 and the interacting components of the retraction/extension 70 is applicable to all blade assemblies 16 of the VDR system.

The VDR blade assembly 16 is mounted to and driven by a rotor hub assembly 18 about an axis of rotation 20. The VDR blade assembly 16 includes a movable outboard bladesection 22 which telescopes over an inboard blade section 24 (hereinafter referred to as a torque tube member) along a longitudinal axis 26. The outboard blade section 22 includes a spar member 30 (see FIG. 2b) which is enveloped by a leading edge sheath 32 and a foam-filled trailing edge pocket assembly to define the requisite aerodynamic contour of the outboard blade section 22. The spar member 30 is coaxially aligned with and accepts the torque tube member 24 so as to permit telescopic translation thereof relative to the torque tube member 24, and, consequently, permit retraction and/or extension of the VDR blade assembly 16.

Coaxial alignment of the torque tube and spar members 24, 30 may be effected by any conventional bearing assembly such as a rolling element bearing assembly. The preferred bearing assembly includes a first bearing block 40a mounted externally to the outboard end of the torque tube member 24 and a second bearing block 40b mounted to the inboard end of the spar member 30, and preferably internally thereto. The first bearing block 40a slideably engages an internal pilot surface 42 formed within the spar member 30 and the second bearing block 40b slideably engages an external pilot surface 44 formed about the exterior of the torque tube member 24.

The inboard end of the torque tube member 24 is adapted for mounting to a cuff assembly 50 which is journally mounted to a radial arm 52 of the rotor hub assembly 18. The cuff assembly 50 includes a pitch control arm 60 through which pitch control inputs are made about the longitudinal axis 26 of the VDR blade assembly 16.

The retraction/extension mechanism 70 according to the present invention includes a reeling assembly 80 and an epicyclic gear train 100 (not fully-shown in FIG. 2a) operative for driving the reeling assembly 80. The reeling assembly 80 includes a cylindrical drum 82 operative for rotation about the rotor hub assembly axis 20 and strap means 84 operative for being wound about or wound off of the cylindrical drum 82. More specifically, the strap means 84 is disposed in winding combination with the cylindrical drum 82 and extends between guide pulleys 85, or other suitable guide means, for centering the strap means 84 so as to be substantially aligned with the longitudinal axis 26 of the rotor blade assembly 16. Furthermore, the strap means 84 extends through an internal chamber IC defined by the torque tube and spar members 24, 30 and is affixed at its outboard end to the spar member 30 by means of a restraint assembly 86. While the strap means 82 may be affixed to the spar member 30 by any suitable means, the preferred restraint assembly 86 includes a retention block 90 (FIG. 2c) having upper and lower transverse slots 94 formed therein for accepting load transfer members 96. The load transfer members 96 engage a bearing surface 30s formed internally of the spar member 30. The strap means 84 mounts to the medial portion of the retention block 90 such that centrifugal loads $C_f$ acting on the outboard blade section 22 are transferred to the strap means 84 via the interlocking combination of the retention block 90 and the load transfer members 96. A restraint assembly of the type described, including assembly details therefor, is described in co-pending, commonly owned U.S. patent application Ser. No. 08/412,035.

Figure 3A:
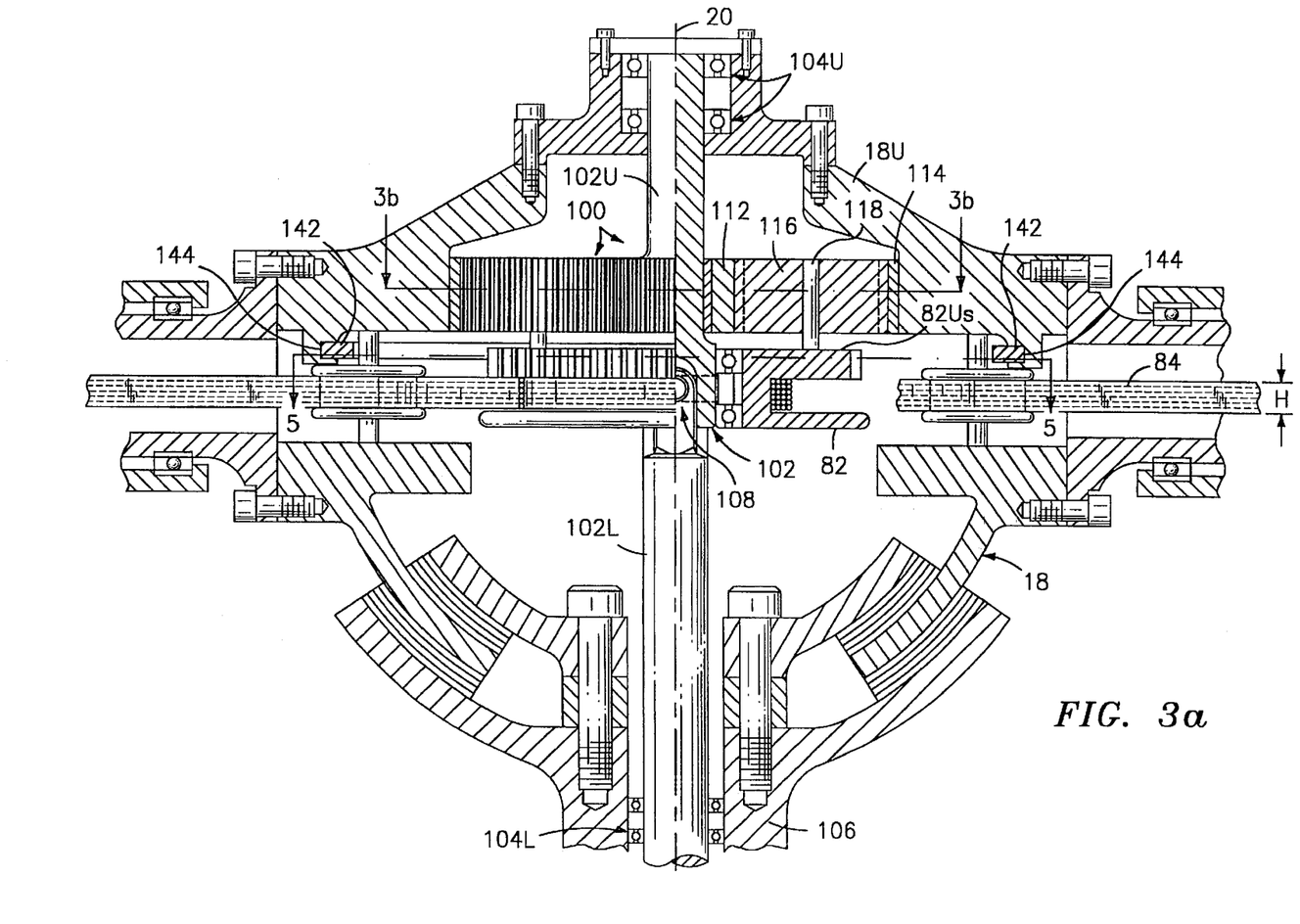
FIG. 3a depicts a broken-away and partially sectioned side view of the retraction/extension mechanism including an epicylic gear train operative for driving a reeling assembly.
Figure 3B:
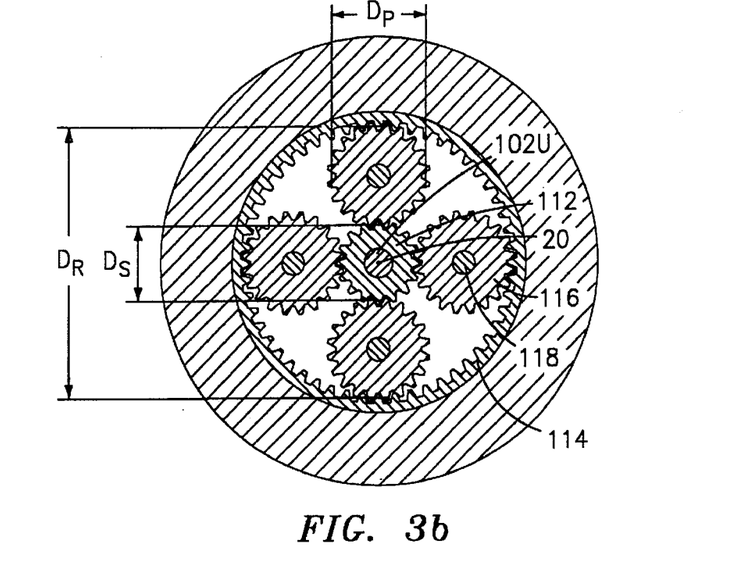

In FIGS. 3a and 3b, the cylindrical drum 82 is disposed internally of the rotor hub assembly 18 and is bearing mounted about an input drive shaft 102 of the epicyclic gear train 100. Accordingly, the cylindrical drum 82 may rotate independent of the input drive shaft 102, i.e., in either direction relative thereto. The input drive shaft 102 is supported at an upper end thereof by the rotor hub assembly 18 via an first bearing assembly 104U, and at a lower end by the main rotor shaft 106 via a second bearing assembly 104L. In the described embodiment, a universal joint 108 is incorporated in the input drive shaft 102 for accommodating gimbal tilt motion of the rotor hub assembly 18. It should be appreciated, however, that the configuration of the input drive shaft 102 and support arrangement therefor will vary depending upon the type of rotor system employed. The universal joint 108, therefore, segments the input drive shaft 102 into of upper and lower shaft segments 102U and 102L, respectively, wherein the cylindrical drum 82 is supported about the upper shaft segment 102U and wherein the drum 82 and upper shaft segment 102U synchronously tilt with the rotor hub assembly 18.

The epicyclic gear train 100 also includes: a driving sun gear 112 (best shown in FIG. 3b) coaxially aligned with the rotor hub assembly axis 20, a ring gear 114 rigidly affixed to an upper portion 18U of the rotor hub assembly 18, and a plurality of planetary pinions 116 disposed between and interacting with the sun and ring gears 112, 114. The sun gear 112 is spline connected to and driven by the upper shaft segment 102U of the input drive shaft 102 and drives the planetary pinions 116 about the rotor hub assembly axis 20. More specifically, the planetary pinions 116 traverse in an epicycle about the sun gear 112 at reduced rotational speed relative thereto due to interaction of the planetary pinion 116 with the ring gear 114. The output of the planetary pinions 116 is transferred to the cylindrical drum 82 by means of carrier posts 118 which are disposed in combination with each planetary pinion 116 and the upper surface 82Us (FIG. 3a) of the cylindrical drum 82.

In operation, the input drive shaft 102 drives the sun gear 112 at a higher or lower rotational speed relative to the main drive shaft 106 thereby causing the planetary pinions 116 to rotate about the sun gear 112. The planetary pinions 116 may be driven in either direction depending upon the speed differential between the input drive shaft 102 and the main rotor drive shaft 106. In turn, the planetary pinions 116 effect rotation of the cylindrical drum 82, thereby causing the strap means 84 to be wound about or off of the cylindrical drum 82 and, consequently, effecting retraction/extension of the blade assembly.

Preferably, the cylindrical drum 82 is driven at a rotational speed which effects full retraction/extension of the rotor blade assembly 16 in about a 10 to 20 second interval. Furthermore, it is desirable to maintain the torsional shear stress in the input drive shaft 102 below about 180,000 lbs/in$^2$(1.24×10$^9$ N/m$^2$) while minimizing the diameter and/or thickness thereof. Moreover, it is desirable to maximize the ratio of the drum diameter Dc (FIG. 2a) to the thickness t of the strap means 84 (Dc/t) for abating fatigue failure. Finally, it is desirable to fabricate the strap means 84 from multi-fiber materials or utilize multi-cable construction to provide redundant load paths for ballistic survivability.

While many geometric, kinematic, and material combinations may be employed to achieve the criteria setforth above, Table I below outlines the parameters of an exemplary retraction/extension mechanism. The retraction/extension mechanism is sized for a rotor system wherein each blade assembly may stroke, i.e., retract and/or extend, by 100 inches (254 cm), and wherein the centrifugal load $C_f$ acting on each blade assembly is about 40,000 lbs (178,000N). Reference dimensions cited below associated with a previously described element may be found in the figure which most clearly depicts the element.

TABLE I

| | |
|---|---|
| Diameter ($D_{Max}$) of the Rotor System | 588" (1494 cm) |
| Rotational speed of the Input Drive Shaft | 5.9 rad/sec |
| Rotational speed of the Main Rotor Shaft | 27.6 rad/sec |
| Sun Gear Diameter ($D_S$) | 6.5" (16.5 cm) |
| Ring Gear Diameter ($D_R$) | 24.0" (61 cm) |
| Planetary Pinion Diameter ($D_P$) | 8.7" (22.1 cm) |
| Sun/Planetary Pinion Ratio ($D_S/D_P$) | .75 |
| Number of Planetary Pinions | 4 |
| Face Width | 7.4" (18.8 cm) |
| Cylindrical Drum Diameter ($D_C$) | 9.0" (22.9 cm) |
| Material composition of the Input Drive Shaft | Titanium |
| Diameter/thickness ratio of Input Drive Shaft | 16 |
| Material composition of Strap Means | Steel/Steel overwrap |
| Height/Thickness (H/t) ratio of Strap Means | 6 |

Figure 4:
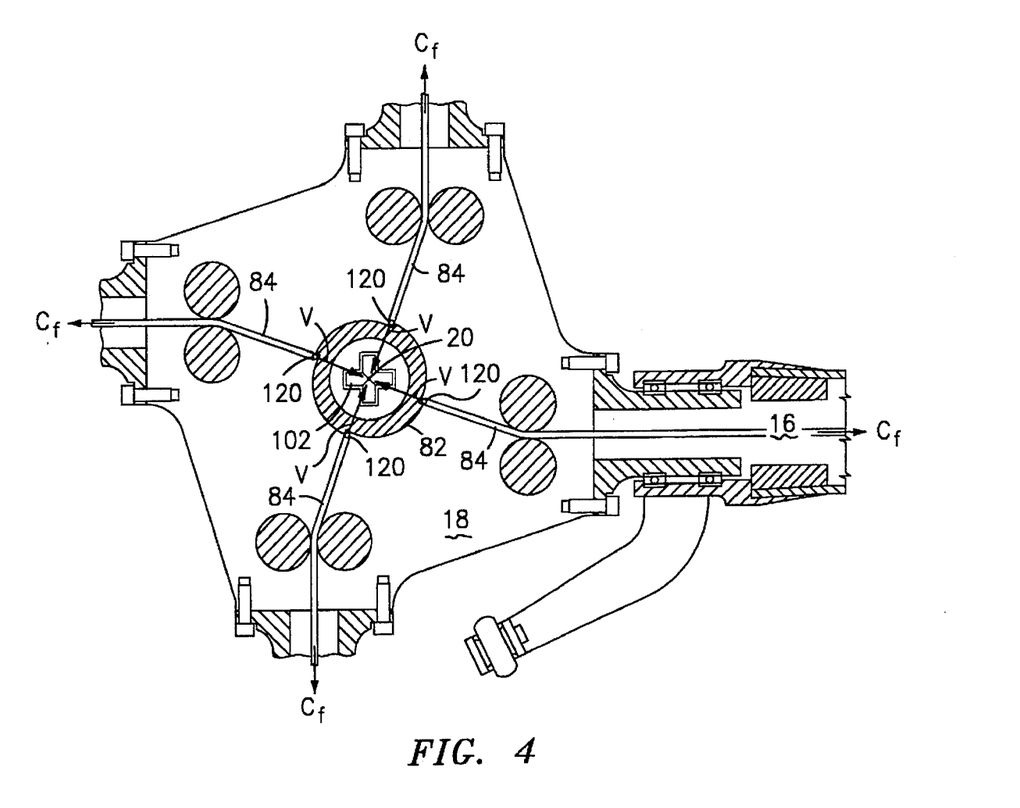
FIG. 4 is an enlarged top view of the reeling assembly which depicts a means for unloading the epicyclic gear train when the VDR blade assemblies are in a fully-extended position.

The retraction/extension mechanism 70 of the present invention employs several mechanisms/methods which provides fail safety during the various operating modes of the rotor system, i.e., when the blade assemblies 16 are fully-extended, fully retracted or in transition. Such fail safety is achieved by reducing the steady and vibratory torsional loads on the input drive shaft 102. In FIG. 4 the blade assemblies are fully-extended and the strap means 84 are completely unwound from the cylindrical drum 82. In this operating mode, the cylindrical drum 82 is rotationally positioned such that the sum of the load transfer vectors V, defined by the strap means 84 at the respective attachment points 120, i.e., points attaching the strap means 84 to the cylindrical drum 82, effect torsional equilibrium about the rotational axis 20 of the rotor hub assembly 18. In the preferred embodiment, the load transfer vectors V intersect the rotational axis 20, however, it will be appreciated that the attachment points 120 and rotational position of the cylindrical drum 82 may be altered to effect the same result. Consequently, when the rotor blade assemblies 16 are fully-extended, the input drive shaft 102 is essentially unloaded in torsion.

Figure 5:
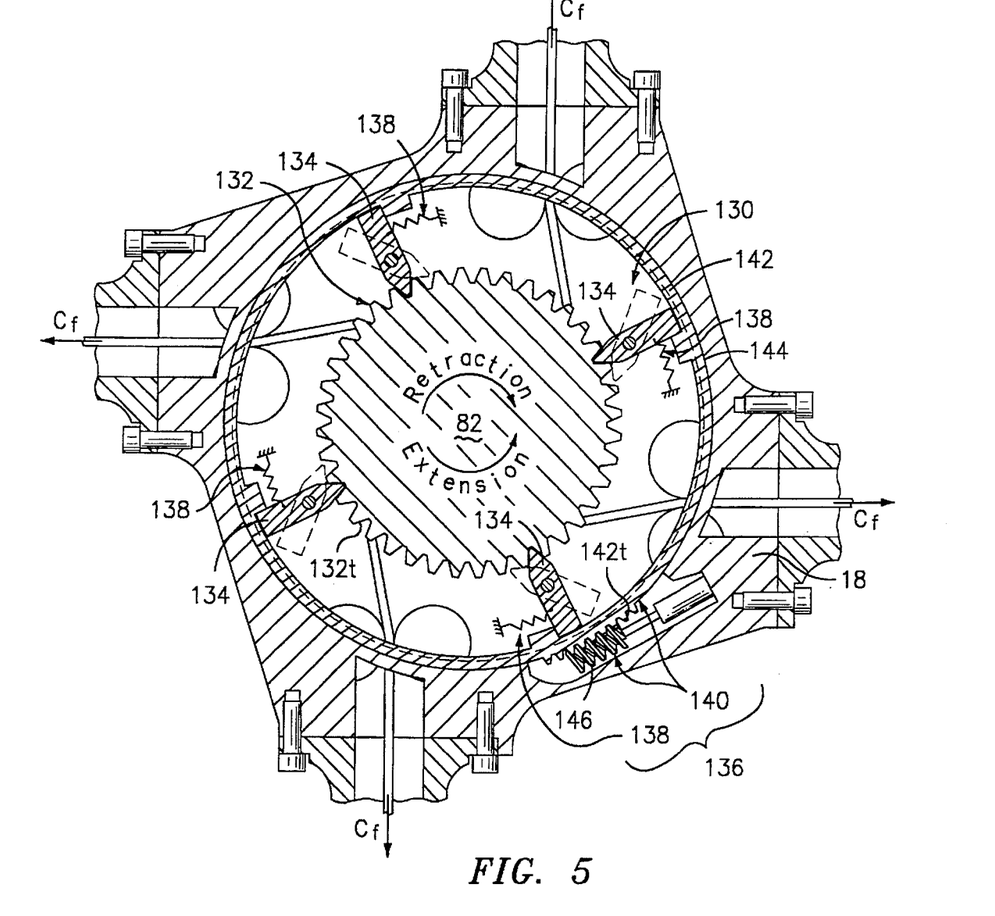
FIG. 5 is a cross-sectional view taken substantially along line 5—5 of FIG. 3a, which depicts a means, in combination with the reeling assembly, for unloading the epicyclic gear train when the VDR blade assemblies are fully-retracted.

In FIG. 5, a ratchet assembly 130 is disposed in combination with the cylindrical drum for reacting the centrifugal loads $C_f$ acting on the outboard blade sections 22 via the rotor hub assembly 18. The ratchet assembly 130 includes a ratchet wheel 132 disposed in combination with, or formed as an integral part of, the cylindrical drum 82, a plurality of pawls 134 pivotably mounted to the rotor hub assembly 18, and an actuation means 136 for causing the pawls 134 to engage or disengage the teeth 132t of the ratchet wheel 132. More specifically, the actuation means 136 includes a spring means 138 for biasing the pawls 134 into engagement with the teeth 132t of the ratchet wheel 132, and a means 140 for forcibly disengaging the pawls 134 from the teeth 134t. In the described embodiment, the disengagement means 140 is an actuator ring 142 disposed in combination with each of the pawls 134 and in combination with the rotor hub assembly 18. More specifically, the actuator ring 142 is captured within a channel 144 (see FIG. 3a) of the rotor hub assembly 18 and translates therein so as to effect rotation of each pawl 134 simultaneously (the pawls 134 have been removed from FIG. 3a for clarity of illustration). Rotation of the actuator ring 142 may be effected by any linear or rotary actuation device. In the described embodiment, a worm gear 146 disposed in combination with the rotor hub assembly 18 interacts with a series of teeth 142t formed about the periphery of the actuator ring 142 to effect rotation thereof within the channel 144.

When the rotor blade assemblies 16 are fully-retracted, the actuator ring 142 is disengaged from the pawls 134 and the spring means 138 causes the pawls 134 to engage the teeth 132t of the ratchet wheel 132. Consequently, centrifugal loads $C_f$ acting on the cylindrical drum 82 by-pass the epicyclic gear train 100 and are reacted directly by the rotor hub assembly 18 via the ratchet assembly 130. It will be appreciated that the resultant load path effectively unloads the input drive shaft 102. When the rotor blade assemblies 16 are to be extended, the actuator ring 142 rotates within the channel 144, in response to rotation of the worm gear 146, thereby disengaging the pawls 134 from the ratchet wheel 132.

While the primary function of the ratchet assembly 130 is to react centrifugal load $C_f$ when the blades assemblies 16 are fully-retracted, a secondary, yet important, function thereof is to provide redundant retention of the blade assemblies 16 in the event that the input drive shaft 102 fails under load, i.e., during transition. That is, the orientation of the pawls 134 relative to the teeth 132t of the ratchet wheel 132 is such that the cylindrical drum 82 may rotate in one direction, i.e., in a clockwise direction corresponding to retraction of the rotor blade assembly 16 while inhibiting rotation in an opposing direction, i.e., in a counterclockwise direction corresponding to extension of the rotor blade assembly 16. Accordingly, should the input drive shaft 102 fail during retraction, the ratchet assembly 120 will engage the cylindrical drum 82 and lock the blade assemblies 16 in their partially retracted position, i.e., prevent extension of the blade assemblies 16.

During transition, the epicyclic gear train 100 reduces the torsional loads imposed on the input drive shaft 102. That is, the epicyclic gear train 100, provides a mechanical advantage which substantially reduces the tangential loading on the sun gear 112, and, accordingly, the torsional loads on the input drive shaft 102. More specifically, depending upon the gear ratio employed, the epicyclic gear train 100 reduces torsional loads by a factor of 3 or more. Consequently, the size, e.g., diameter, and thickness of the input drive shaft 102 may be reduced, thereby minimizing the design envelop and/or weight thereof.

Figure 6:
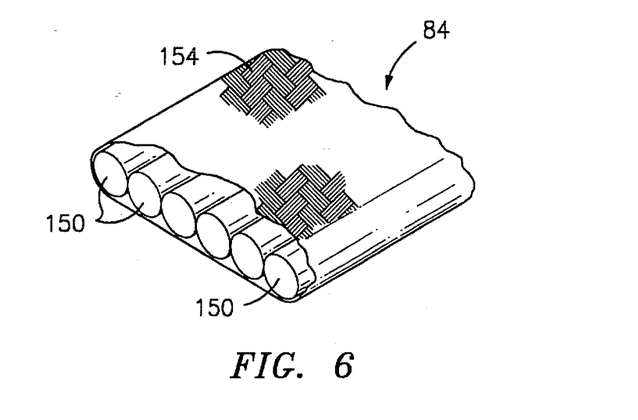
FIG. 6 is an enlarged sectional view of a compliant straps means of the reeling assembly.

In addition to the benefits associated with unloading and/or reducing the loads imposed on the input drive shaft 102, the strap means 84 provides improved fatigue life and ballistic survivability as compared to the jackscrew assembly of the prior art. More specifically, the strap means 84 is comprised of a multiplicity of individual fibers or cables which results in low bending stresses when exposed to the rigorous vibratory bending environment of the rotor blade assembly. Furthermore, the individual fibers/cables provides multiple load paths for ballistic survivability. In FIG. 6, the preferred strap means 84 includes a multiplicity of planar oriented stainless steel cables 150 which are over-wrapped and bound by means of a steel filament overwrap 154. Such steel cables are available from Bridon American Corporation of Wilkes-Barre, Pa. under the Tradename—Dyform-6.

Alternatively, high strength graphite or polyamide fibers/ cables disposed in a high strain elastomer matrix may be employed for obtaining the requisite strength properties. While six individual cables 150 are shown, the precise number of cables 150 will vary depending on the centrifugal load $C_f$ acting on the outboard blade section 22.

As mentioned earlier, it is desirable to maximize the ratio between the diameter Dc of the cylindrical drum 82 and the thickness t of the strap means 84 to maximize the fatigue life of the strap means 84. While this ratio will vary depending upon the specific cable geometry, e.g., strands per cable, wires per strand, etc., this ratio is preferably greater than about 20 for providing acceptable fatigue life. In Table II, a list of cable-types and minimum drum/strap thickness (Dc/t) ratios therefor is provided for yielding acceptable service life.

TABLE II

| Cable Geometry (strands per cable × wires per strand) | Min. Ratio - (Dc/t) |
| --- | --- |
| 6 × 7 | 42 |
| 19 × 7 | 34 |
| 6 × 19 | 43 |
| 6 × 21 | 30 |
| 6 × 25 | 26 |
| 6 × 36 | 23 |
| 8 × 25 | 21 |
| 6 × 41 | 21 |

In addition to the above described features which provide fail safety improved reliability, and ballistic survivability, it will be appreciated that the retraction/extension mechanism 70 of the present invention provides direct control of rotor blade length. That is, pilot control inputs may be made directly to the input drive shaft 102 for positioning the outboard blade section 22. In contrast, the prior art reeling assemblies rely upon the magnitude of torque loading on the drive shaft, i.e., the torque produced by collective control inputs, to retract and extend the rotor blade assemblies.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. A retraction/extension mechanism (70) for a Variable Diameter Rotor system (10), the Variable Diameter Rotor system (10) having a plurality of rotor blade assemblies (16) mounted to and rotating with a rotor hub assembly (18) about an axis of rotation (20), each rotor blade assembly (16) having inboard and outboard blade sections (24, 22) wherein the outboard blade section (22) telescopically mounts to the inboard blade section (24), the retraction/extension mechanism (70), comprising:

a reeling assembly (80) disposed internally of the rotor hub assembly (18) and each rotor blade assembly (16), said reeling assembly (80) disposed in combination with the outboard blade section (22) of each rotor blade assembly (16); and an epicyclic gear train (100) disposed in combination with the rotor hub assembly (18) and said reeling assembly (80), said epicyclic gear train (100) being operative for driving said reeling assembly (80) so as to effect telescopic transition of the outboard blade sections (22) with respect to the inboard blade sections (24).

2. The retraction/extension mechanism (70) according to claim 1 wherein the inboard and outboard blade sections(24, 22) define an internal chamber (IC) and wherein said reeling assembly (80) includes:

a cylindrical drum (82) disposed internally of the rotor hub assembly (18) and operative for rotation about the rotor hub assembly axis (20); and strap means (84) disposed internally of each internal chamber (IC) and in combination with each outboard blade section (22) and said cylindrical drum (82), said strap means (84) operative for being wound about or wound off of said cylindrical drum (82).

3. The retraction/extension mechanism (70) according to claim 1 wherein said epicyclic gear train (100) includes:

an input drive shaft (102);

a driving sun gear (112) being driven by said input drive shaft (102);

a ring gear (114) affixed to and supported by the rotor hub assembly (18);

a plurality of planetary pinions (116) disposed between and interacting with said sun and ring gears (112, 114) such that said planetary pinions (116) translate about said sun gear (112), in response to rotation thereof; and carrier posts (118) disposed in combination with said planetary pinions (116) and said cylindrical drum (82).

4. A retraction/extension mechanism (70) for a Variable Diameter Rotor system (10), the Variable Diameter Rotor system (10) having a plurality of rotor blade assemblies (16) mounted to and rotating with a rotor hub assembly (18) about an axis of rotation (20), each rotor blade assembly (16) having inboard and outboard blade sections (24, 22) wherein the outboard blade section (22) telescopically mounts to the inboard blade section (24), the inboard and outboard blade sections (24, 22) of each blade assembly (16) defining an internal chamber (IC), the retraction/extension mechanism (70), comprising:

a reeling assembly (80) including:

a cylindrical drum (82) disposed internally of the rotor hub assembly (18) and operative for rotation about the rotor hub assembly axis (20); and strap means (84) disposed internally of each internal chamber (IC) and in combination with each outboard blade section (22) and said cylindrical drum (82), said strap means (84) operative for being wound about or wound off of said cylindrical drum (82); and an epicyclic gear train (100) disposed in combination with the rotor hub assembly (18) and said cylindrical drum (82), said epicyclic gear train (100) operative for effecting rotation of said cylindrical drum (82).

5. The retraction/extension mechanism (70) according to claim 4 wherein said epicyclic gear train (100) includes:

an input drive shaft (102);

a driving sun gear (112) being driven by said input drive shaft (102);

a ring gear (114) affixed to and supported by the rotor hub assembly (18);

a plurality of planetary pinions (116) disposed between and interacting with said sun and ring gears (112, 114) such that said planetary pinions (116) translate about said sun gear (112), in response to rotation thereof; and carrier posts (118) disposed in combination with said planetary pinions (116) and said cylindrical drum (82).

6. The retraction/extension mechanism (70) according to claim 5 wherein said carrier posts (118) are affixed to an upper surface (82Us) of said cylindrical drum (82).

7. The retraction/extension mechanism (100) according to claim 4 wherein said cylindrical drum (82) defines a diameter dimension (Dc), and wherein said strap means (84) defines a thickness dimension (t), and wherein the ratio of the diameter dimension (Dc)/thickness dimension (t) is at least about 20.

8. The retraction/extension mechanism (100) according to claim 4 wherein said strap means (84) is comprised of a plurality of planar oriented cables (150).

9. The retraction/extension mechanism (70) according to claim 4 further including means (85) for guiding said strap means (84) such that said strap means (84) is centrally disposed in the internal chambers (IC) of each rotor blade assembly (16).

10. The retraction/extension mechanism (70) according to claim 4 wherein rotation of the rotor blade assemblies (16) produces centrifugal loads ($C_f$), and said retraction/extension mechanism (70) further comprises a means (130), in combination with said cylindrical drum (82), for reacting said centrifugal loads ($C_f$) via the rotor hub assembly (18).

11. The retraction/extension mechanism (70) according to claim 10 wherein said reacting means (130) includes:

a ratchet wheel (132) having a plurality of teeth (132t), said ratchet wheel (132) being disposed in combination with said cylindrical drum (82);

at least one pawl (134) pivotably mounted to the rotor hub assembly (18) and operative for engaging said teeth (132t) of said ratchet wheel (134); and actuation means (136) for causing said pawls (134) to alternately engage and disengage from said ratchet wheel (132).

12. The retraction/extension mechanism (70) according to claim 4 wherein said retraction/extension mechanism (70), in combination with the rotor blade assemblies (16), define a fully-extended position;

wherein said cylindrical drum (82) and said strap means (84) define attachment points (120) and wherein said strap means (84) further define load transfer vectors (V) at each of said attachment points (120); and wherein said epicyclic gear train (100) effects rotational displacement of said cylindrical drum (82) such that, in said fully-extended position, the sum of said load transfer vectors (V) effects torsional equilibrium about the rotational axis (20) of the rotor hub assembly (18).

13. The retraction/extension mechanism (70) according to claim 12 wherein said load transfer vectors (V) intersect the rotational axis (20) of the rotor hub assembly (18).

14. A retraction/extension mechanism (70) for a Variable Diameter Rotor system (10), the Variable Diameter Rotor system (10) having a plurality of rotor blade assemblies (16) mounted to and rotating with a rotor hub assembly (18) about an axis of rotation (20), each rotor blade assembly (16) having inboard and outboard blade sections (24, 22) wherein the outboard blade section (22) telescopically mounts to the inboard blade section (24), the inboard and outboard blade sections (24, 22) of each blade assembly (16) defining an internal chamber (IC), the retraction/extension mechanism (70), comprising:

a cylindrical drum (82) disposed internally of the rotor hub assembly (18) and operative for rotation about the rotor hub assembly axis (20); and strap means (84) disposed internally of each internal chamber (IC) and in combination with the outboard blade section (22) and said cylindrical drum (82), said strap means (84) operative for being wound about or wound off of said cylindrical drum (82); and an epicyclic gear train (100) including:

an input drive shaft (102);

a driving sun gear (112) being driven by said input drive shaft (102);

a ring gear (114) affixed to and supported by the rotor hub assembly (18);

a plurality of planetary pinions (116) disposed between and interacting with said sun and ring gears (112,114) such that said planetary pinions (116) translate about said sun gear (112), in response to rotation thereof; and carrier posts (118) disposed in combination with said planetary pinions (116) and said cylindrical drum (82), for effecting rotation of said cylindrical drum (82);

whereby rotation of said cylindrical drum (82) effects telescopic translation of the outboard blade sections (22) relative to the inboard blade sections (24).

15. The retraction/extension mechanism (100) according to claim 14 wherein said cylindrical drum (82) defines a diameter dimension (Dc), and wherein said strap means (84) defines a thickness dimension (t), and wherein the ratio of the diameter dimension (Dc)/thickness dimension (t) is at least about 20.

16. The retraction/extension mechanism (100) according to claim 14 wherein said strap means (84) is comprised of a plurality of planar oriented cables (150).

17. The retraction/extension mechanism (70) according to claim 14 wherein said carrier posts (118) are affixed to an upper surface (82Us) of said cylindrical drum (82).

18. The retraction/extension mechanism (70) according to claim 14 further including means (85) for guiding said strap means (84) such that said strap means (84) is centrally disposed in the internal chambers (IC) of each rotor blade assembly (16).

19. The retraction/extension mechanism (70) according to claim 14 wherein rotation of the rotor blade assemblies (16) produces centrifugal loads ($C_f$), and said retraction/extension mechanism (70) further comprises a means (130), in combination with said cylindrical drum (82), for reacting said centrifugal loads ($C_f$) via the rotor hub assembly (18).

20. The retraction/extension mechanism (70) according to claim 19 wherein said reacting means (130) includes a ratchet wheel (132) having a plurality of teeth (132t), said ratchet wheel (132) being disposed in combination with said cylindrical drum (82);

at least one pawl (134) pivotably mounted to the rotor hub assembly (18) and operative for engaging said teeth (132t) of said ratchet wheel (132); and actuation means (136) for causing said pawls (134) to alternately engage and disengage from said ratchet wheel (132).

21. The retraction/extension mechanism (70) according to claim 14 wherein said retraction/extension mechanism (70), in combination with the rotor blade assemblies (16), define a fully-extended position;

wherein said cylindrical drum (82) and said strap means (84) define attachment points (120) and wherein said strap means (84) further define load transfer vectors (V) at each of said attachment points (120); and wherein said epicyclic gear train (100) effects rotational displacement of said cylindrical drum (82) such that, in said fully-extended position, the sum of said load transfer vectors (V) effects torsional equilibrium about the rotational axis (20) of the rotor hub assembly (18).

22. The retraction/extension mechanism (70) according to claim 21 wherein said load transfer vectors (V) intersect the rotational axis (20) of the rotor hub assembly (18).

* * * * *